H. HOWARD.
PROCESS OF MAKING SULFURIC ACID.
APPLICATION FILED JUNE 26, 1914.
1,151,103.
Patented Aug. 24, 1915.
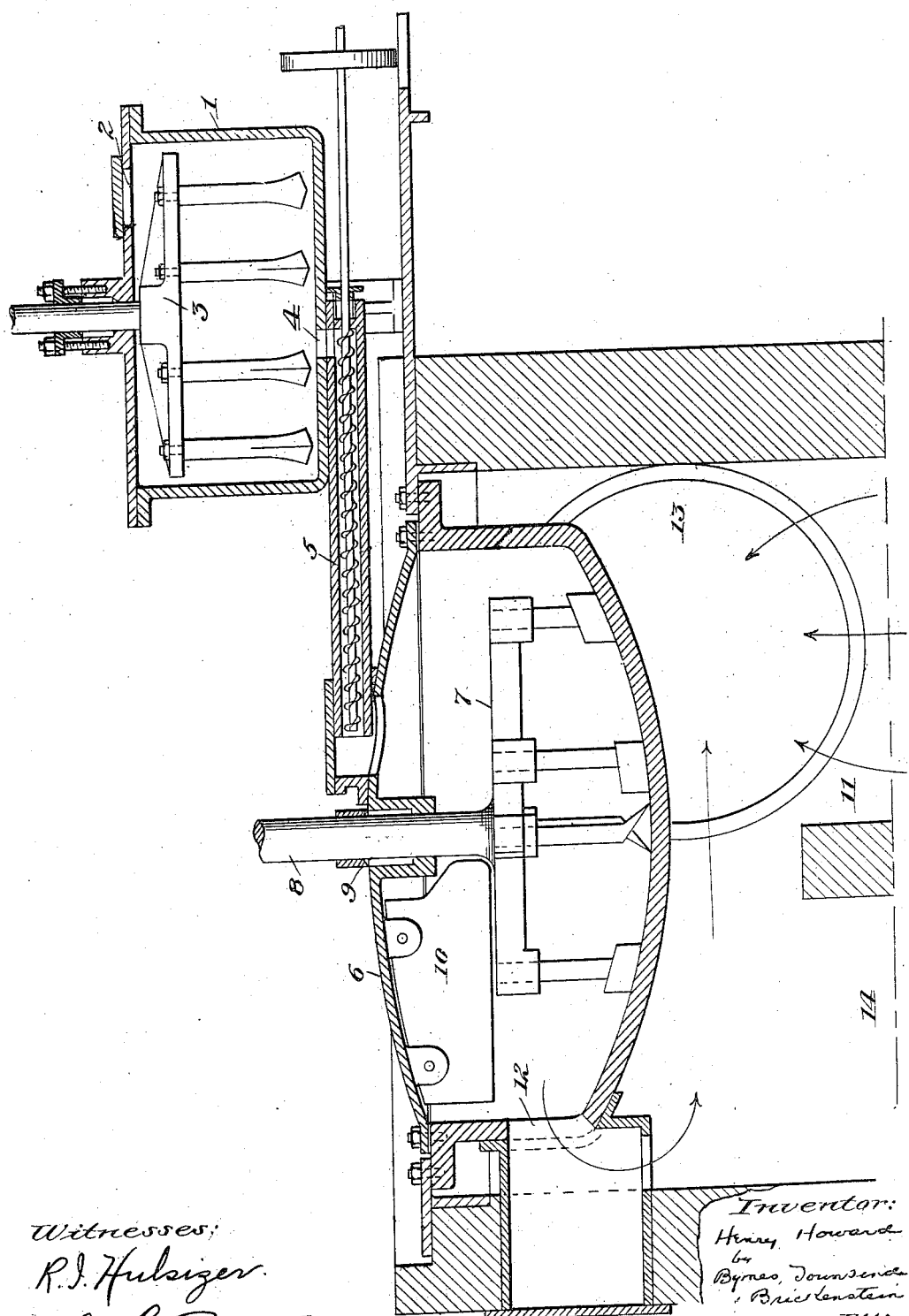

UNITED STATES PATENT OFFICE.

HENRY HOWARD, OF BROOKLINE, MASSACHUSETTS.

PROCESS OF MAKING SULFURIC ACID.

1,151,103.  Specification of Letters Patent.  Patented Aug. 24, 1915.

Application filed June 26, 1914. Serial No. 847,498.

*To all whom it may concern:*

Be it known that I, HENRY HOWARD, a citizen of the United States, residing at Brookline, in the county of Norfolk and State of Massachusetts, have invented certain new and useful Improvements in Processes of Making Sulfuric Acid, of which the following is a specification.

This invention relates to processes of making sulfuric acid by the oxidation of sulfur dioxid by nitric acid, as for example in the chamber process.

The object of the invention is to provide a process according to which nitric acid, or a mixture thereof with oxids of nitrogen available for the oxidation of sulfur dioxid, may be introduced in regulated, uniform and continuous flow into the stream of gases carrying sulfur dioxid, while at the same time sodium sulfate ($Na_2SO_4$) is produced as a by-product. The gaseous reaction products, including the nitric acid, are hereinafter referred to as " the evolved oxids of nitrogen."

It is customary to evolve nitric acid from a mixture of sodium nitrate and sulfuric acid introduced at intervals into the niter pot, located in the burner-gas flue. This method yields as a residue the comparatively valueless acid sulfate of sodium ($HNaSO_4$) and presents the disadvantages of affording an intermittent or at best ununiform supply of nitric acid and of involving some dilution of the burner gases by air when the pots are charged or discharged. It has been sought to overcome these difficulties by the direct introduction of nitric acid in a regulated stream, usually to the Glover tower; but this method has proven so expensive as to prevent its general adoption.

According to the present process, sodium nitrate and sulfuric acid are intimately mixed in the proportion of two molecules of sodium nitrate to one molecule of sulfuric acid, without external heating, and this mixture, together with such reaction products as may be formed, is fed in a regulated and continuous manner to a suitable mechanical furnace, which is externally heated, preferably by means of the hot burner gases. From this furnace the solid sodium sulfate is discharged as it is formed. Under these conditions, I am able, on the one hand, to produce a continuous and uniform current of evolved oxids of nitrogen to be commingled with the burner gases, or with the sulfur dioxid at any desired point in its movement to the chambers; and, on the other hand, to prepare directly a marketable grade of sodium sulfate.

While the nitric acid produced according to the present process is accompanied by a certain proportion of other oxids of nitrogen, this is not, under the conditions, a material defect, inasmuch as all of the higher oxids of nitrogen are in any case immediately reduced upon contact with the sulfur dioxid.

A preferred form of apparatus for carrying out the present invention is illustrated in the accompanying drawing, wherein the figure is a vertical sectional view.

In said figure, 1 represents a covered mixing vessel provided with a charging aperture 2 and a rotary stirrer 3. In this vessel the sodium nitrate and sulfuric acid are intimately mixed in substantially the proportions required by the equation—

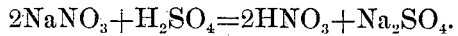

$$2NaNO_3 + H_2SO_4 = 2HNO_3 + Na_2SO_4.$$

This mixture, which undergoes partial reaction in the vessel 1, passes by the outlet 4 to a screw conveyer 5, and is delivered continuously and uniformly to the mechanical furnace 6. This furnace is provided with a rotary stirrer 7, driven by a shaft 8, entering the furnace through a stuffing-box 9 in the cover.

10 is a scraper for keeping the stirrer free from accumulations.

In the construction illustrated, the mechanical furnace 6 is mounted in the burner-gas flue 11, and receives its heat from the hot gases. The evolved oxids of nitrogen flow through the opening 12 and thence, as indicated by the arrows, to the burner-gas flue 11, the combined gases then passing to the Glover tower through the flue 13. Or, if desired, the nitric gases may be introduced into the current of sulfur dioxid in the Glover tower, or at any suitable point in its movement to the chambers. The sodium sulfate which constitutes the solid residue of the reaction, is kept in loose, solid condition by the vigorous stirring and is continuously discharged by the stirrer 7 through the outlet 12, and collects at 14, whence it may be recovered as desired.

By proceeding as above described and properly regulating the speed of the conveyer 5, I am enabled to provide a continuous and uniform evolution of oxids of nitrogen, in quantity accurately adjusted to the requirements of the process, without diluting the burner gases by air. I am, moreover, as above stated, enabled to obtain as a by-product, marketable sodium sulfate in place of the acid sodium sulfate which is the residue from the ordinary niter pots.

I claim:—

1. In a process of making sulfuric acid, the steps which consist in continuously feeding sodium nitrate and sulfuric acid to a suitable reaction vessel in substantially the proportion of two molecules of sodium nitrate to one molecule of sulfuric acid, heating the said mixture, stirring the reacting mass, commingling the evolved oxids of nitrogen with the gases containing sulfur dioxid, and continuously discharging the residual solid sodium sulfate.

2. In a process of making sulfuric acid, the stops which consist in continuously feeding an intimate mixture of sodium nitrate and sulfuric acid to a suitable reaction vessel in substantially the proportion of two molecules of sodium nitrate to one molecule of sulfuric acid, heating the said vessel, stirring the reacting mass, commingling the evolved oxids of nitrogen with the gases containing sulfur dioxid, and continuously discharging the residual solid sodium sulfate.

In testimony whereof I affix my signature in presence of two witnesses.

HENRY HOWARD.

Witnesses:
M. V. O'BRIEN,
EVERETT E. BRAINARD.

Copies of this patent may be obtained for five cents each, by addressing the "Commissioner of Patents, Washington, D. C."